Sept. 14, 1937.  W. N. DICKINSON  2,093,074
ELECTRICAL CONTROL DEVICE
Filed Jan. 15, 1934  4 Sheets-Sheet 1
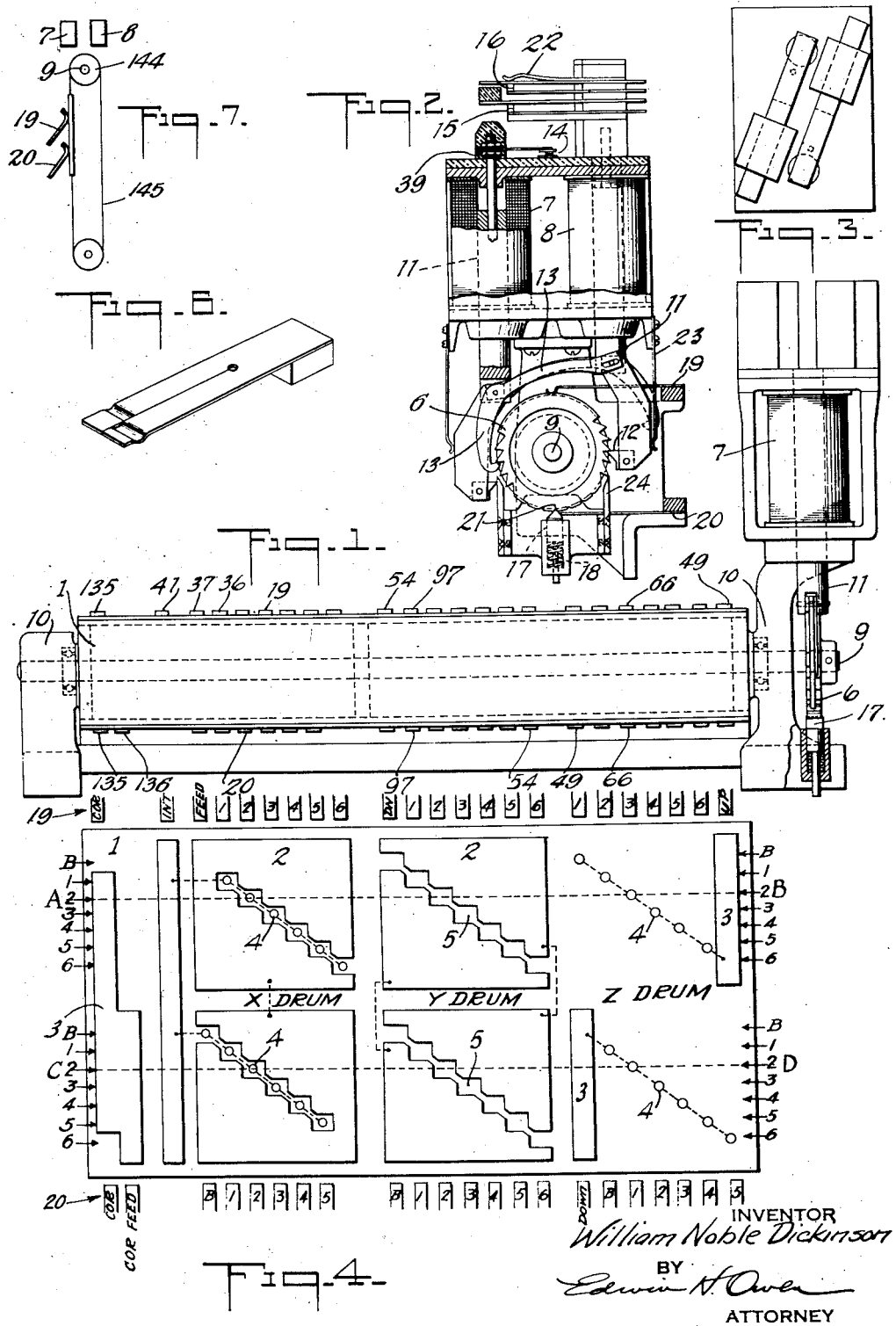
INVENTOR
William Noble Dickinson
BY
Edwin N. Owen
ATTORNEY

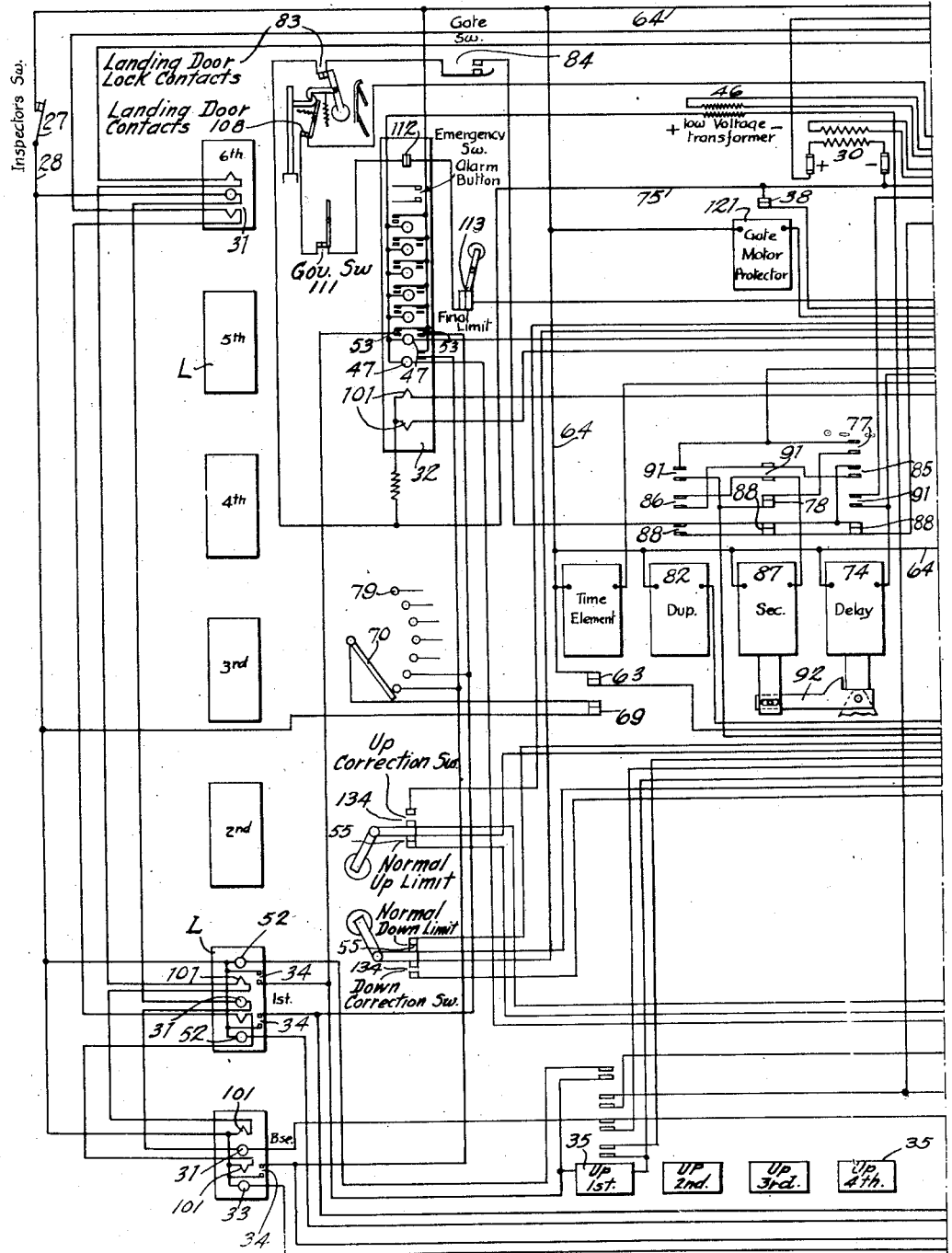

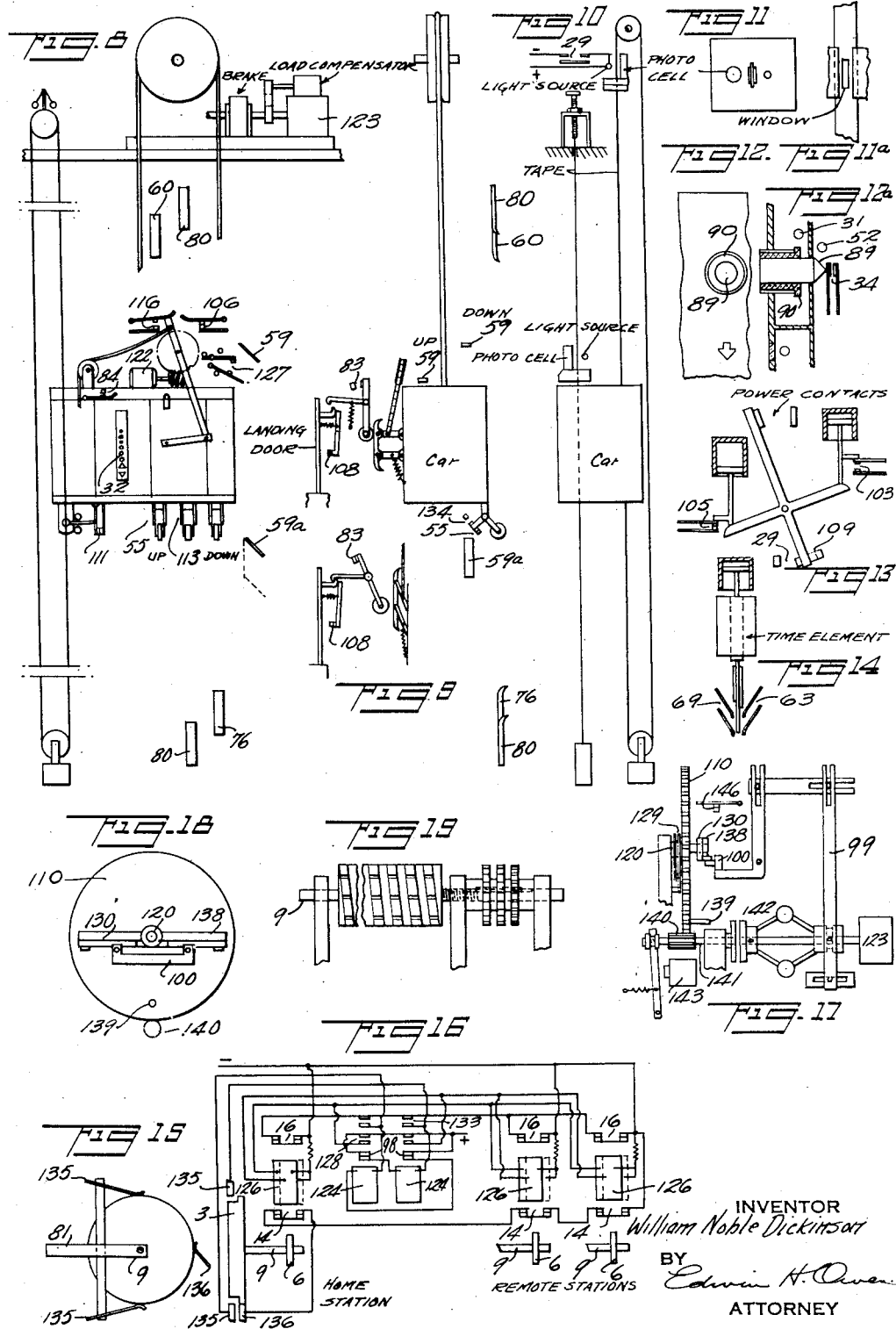

Patented Sept. 14, 1937

2,093,074

UNITED STATES PATENT OFFICE 2,093,074

ELECTRICAL CONTROL DEVICE

William Noble Dickinson, Rockville Centre, N. Y.

Application January 15, 1934, Serial No. 706,759

21 Claims. (Cl. 187—29)

My invention relates to a means for controlling the operation of various types of apparatus or remotely controlled mechanism, including industrial plant operation, but more particularly relates to a completely automatic elevator with selective accumulative control.

The principal object of the invention is to provide a controlling element which is adapted to be coupled with a system of relays and the like in an electrical circuit to take complete control of any system wherein a series of pre-determined operations are to be performed, and to do same in a precise and extremely accurate manner.

An automatic elevator of the single push, two button accumulative, selective type has been chosen as one example of a system to be controlled, because of the complex and complicated problems involved, but it is to be understood that the controlling system as a whole is adaptable for use in any capacity which comes within the scope of the appended claims.

The controller used according to my invention to control the above, briefly stated, generally comprises an electrical circuit arranging device which is adapted to be moved periodically by the movement of the car on approaching each floor, and has a number of contact and insulating surfaces thereon which are engageable by contact fingers, the fingers being electrically connected with a series of electro-magnets, switches or contacts, including the motive power and signal members, in such manner that upon each movement of the circuit arranging device, a new combination of circuits is set up to perform a required number of pre-determined control functions at the required time. The circuit arranging device may be termed as the heart or might even be termed the brain power of the entire control system. It further provides a direct 1:1 ratio of control, and uniform exactness in comparison with a multiple geared ratio between the movement of the car and action of a contact means, now commonly in use which latter multiplies inaccuracies. The periodic or step-by-step movement of the circuit arranging device as compared with the continuous action commonly employed, further results in compactness in size and increased life due to reduction in wear.

By way of example, a comparison will now be made between an elevator control system in common use and a system according to this invention. Let us assume that an apartment house having six floors and a basement has an elevator of one of the commonly known types in which a sprocket chain runs the length of the hoistway and rotates series of members, each of which is adapted to be thrown into a contact position to energize a floor magnet, then through a multiplicity of other magnets, the whole control of the system is accomplished. Let us assume that the movement of the contact making members of the types in common use is reduced by a ratio of 1:30 with relation to the movement of the sprocket chain or car; therefore any inaccuracies due to wear of parts, backlash of gearing, arcing of contacts or stretch of the chain will cause the accumulated difference to be multiplied by thirty in the effect of the manipulation of the contact making members with respect to the position of the car. Even so small an accumulated difference as one-sixteenth of an inch at the contact members results in a difference of almost two inches in the level at which the car is brought to rest.

With the structure according to my invention, a small compact rotatable cylinder is intermittently rotated a distance of about one-fourth of an inch at each step of rotation by means of a pawl and ratchet movement actuated through an electro-magnetic means energized directly through the contacting of a switch arm on the car with an obstruction at each floor in the hoistway. The movement of the cylinder therefore is in a direct relation with the movement of the car and there will be no change in the accurate movement thereof since the actuating movement is provided by an electro-magnet which repeats the same stroke at every impulse, and further, there is no appreciable wear on the cylinder contacts and their associated stationary contacting fingers, as the cylinder moves only a short distance at each impulse of the electro-magnet. These impulses are related to the positions for which stops are required, and not to the distance traveled by the car. Hence, for an express elevator which does not serve a number of intervening floors, there need be only one impulse to provide for the stop at the floor succeeding such no-service intervening floors. The selective and accumulative features in my device provide for accurate control of the car to cause same to serve the furthest call registered in the particular direction of car travel before reversing its direction of travel, which thereby provides a more satisfactory elevator service and reduces unnecessary mileage. The location of the controller furthermore may be in a position entirely independent of the location of the hoistway or elevator machinery, whereas those commonly known require a location in such position as will permit a direct mechanical connection with some moving part of the elevator equipment.

I will describe the system in its relation to an alternating current completely automatic electric elevator in which the heavy operating machinery and controller are remotely located in either the roof-house or basement. The car travels up and down a hoistway, and various inter-related mechanical and electrical devices are located in the hoistway, on the movable car and at the various landings. The general requirements for automatic elevator operation are safe, smooth, quiet, reliable automatic functioning in response to initiative action by any person with or without judgment or functional knowledge, at any landing or in the car. More specifically, with my invention a cumulatively selective system for the control of calls is provided, for automatically determining the direction of travel of the car in response to an initial call and for serving a multiplicity of calls without confusion or unnecessary travel, and without false stops, in such sequence as will best meet the convenience of users and the demands of efficient service. Provision is made for stopping within limits, for emergency stopping from the car or stopping in the event of over-speeding, blowing of fuses or changes in alternating current phase relations, and for the self-closing of landing doors and the automatic opening and closing of the car gate; also for some visual indication at the landings and in the car when the car is in use. The location of the controller is entirely independent of the location of the hoistway or of the elevator machinery.

Referring to the drawings, in which like numbers refer to like parts,

Fig. 1 is a front elevational view of a circuit arranging device with electro-magnetic means for operation;

Fig. 2 is an end view of Fig. 1;

Fig. 3 is a plan view of the electro-magnet portion of the device;

Fig. 4 shows the cylindrical surface of the circuit arranging cylinder developed on a plane surface, together with the interior electrical connections between the several parts. The lines A—B and C—D represent the contacting lines of stationary contacting fingers resting on the cylinder in one normal position of the cylinder;

Fig. 5 and 5a is a wiring diagram showing the electrical connections between all inter-related parts;

Fig. 6 is a detail view of the construction of one of the fingers which engage the surface of the circuit arranging device at X drum;

Fig. 7 is a diagrammatic view showing a modified arrangement of the contacting fingers applied to a plane surface instead of a cylindrical surface.

Fig. 8 shows diagrammatically the general arrangement of an elevator machine, car and related parts.

Fig. 9 is a side view of Fig. 8.

Fig. 10 shows two methods of employing photocells in conjunction with opaque tapes provided with windows; it being assumed that one car is beyond the other car.

Fig. 11 is a diagrammatic plan view of the tape, with guides and photo-cell and source of light positions.

Fig. 11a is a side view of the tape, showing guides and a window.

Fig. 12 is a front view of a push button and a direction arrow.

Fig. 12a is a vertical section view through the push button.

Fig. 13 shows the mechanics of the potential switch and associated time elements.

Fig. 14 shows the arrangement of the separate electro-magnetically operated time element.

Fig. 15 is a diagrammatic side view of a pivoted rocker arm supporting fingers 135 of a correction or synchronizing switch.

Fig. 16 is a diagrammatic front view of a correcting or synchronizing system, together with the electrical connections.

Fig. 17 is a diagrammatic view of a load compensator.

Fig. 18 is a side view of gear 110, and associated parts, of Fig. 17.

Fig. 19 is a diagrammatic side elevation of a device for providing lateral movement of the rotatable cylinder.

Figure 5A:
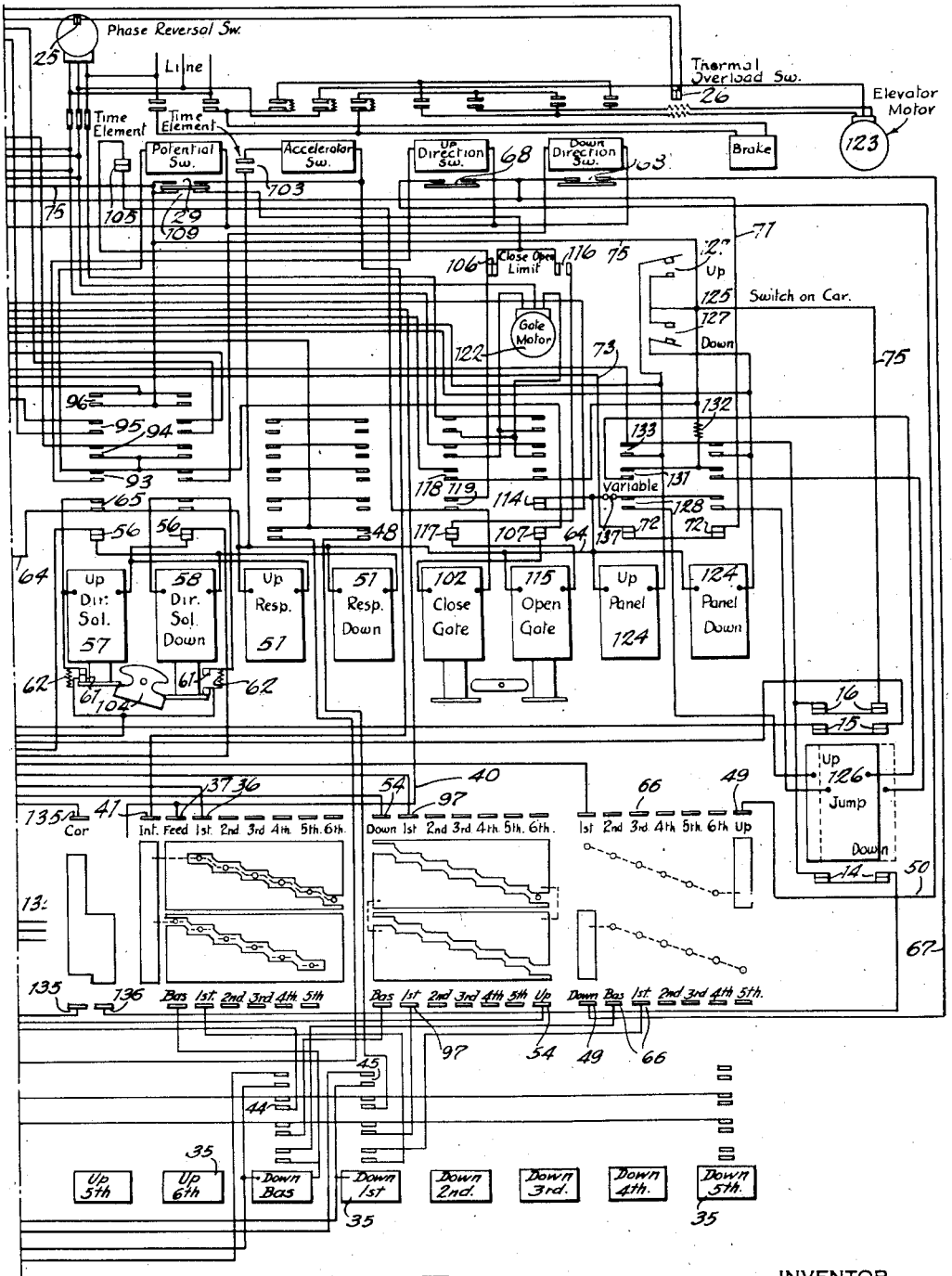

In Fig. 8, a typical worm gear, traction drive elevator machine is shown at the top of the hoistway, cabled to an elevator car. A gearless machine might be shown, as the system is applicable to any rise and any speed. A load compensator is shown belted to the motor shaft, together with the customary type of car safety governor. One side of an endless rope is secured by a friction attachment to the car and causes the governor sheave to revolve when the car is in motion. Should the car attain excessive speed, the governor actuates cams which arrest the rope and it is released from the friction attachment on the car. A mechanical connection from the rope then opens governor switch 111.

Mounted on top of the car is shown a worm gear speed reduction driven by motor 122. Mounted on the gear shaft is an arm adapted to open and close the car gate when the motor is revolved in one direction or the other. Attached to this arm is a chain or a lever which causes a cam to be advanced from the face of the car as the car gate opens, and to retire this cam as the car gate closes. The car gate is shown in open position. As the arm approaches either limit of movement, it opens a corresponding limit switch 116 or 106, which results in the cutting off of the current from motor 122. Each of these limit switches closes immediately the arm moves away from it.

Also mounted on top of the car are two adjustably mounted switches (only one shown —127—) whose arms engage with a stationary obstruction 59 in the hoistway as the car approaches each landing for which associated stopping provision is made. If a longer time of contacting is desired, a face is provided as in 59a. The electrical contacting of these switches 127 effects the operating of the circuit arranging device. One of these switches relates to up stops and one to down stops and each is in vertical alignment with its corresponding set of obstructions 59. The switch arm is pivoted and is of spring material, and normally rests at an angle to the horizontal. The obstruction is also at an angle to the horizontal. As the switch arm engages with the obstruction it is rotated on its pivoted axis, thus extending the switch arm further into engagement with the obstruction to insure a firm contacting. As the switch arm passes the horizontal level of the obstruction, it commences to reduce this engagement with the obstruction and, hence, to reduce the flexing of the switch arm at the time that disengagement takes place. The contact against which the switch arm contact impinges also is permitted a slight movement. Both of these electrical contacts are insulated from the switch arm. The switch shown is for the down direction of car travel, and as the car travels down, the switch arm momentarily engages with an obstruction 59, contacts 127 close, the arm springs by the obstruction and contacts 127 open. For the up direction, the vertical relation of contacts 127 is reversed and a spring normally maintains them in separated relation. When this switch arm in ascending, engages with an obstruction 59 in its own vertical alignment, contacts 127 momentarily close and are then spring-returned to open position as the switch arm springs by the obstruction. Either switch arm, when engaging with one of its obstructions while traveling in a direction opposite to that for which its operative action is designed, springs by that obstruction without effecting a contacting at 127. As the car gate closes, it closes contacts 84. As it opens, it opens contacts 84.

Within the car is the case or gang switch 32 containing the emergency switch and the operating push buttons and signals.

Mounted under the car, in addition to governor switch 111, are three cam operated switches which engage with their respective stationary cams in the hoistway. One engages with cam 60 as the car approaches the upper terminal landing, one engages with cam 76 as the car approaches the lower terminal landing, and one engages with either upper or lower cams 80 should the car pass the level of its terminal landing.

Fig. 9, in addition to showing a side view of the obstructions, cam operated switches and cams of Fig. 8, shows the relation of the retiring cam on the car to the doorlocks and their associated contact 83 at the several landings, and the relation of these doors to their locks and contacts at the several landings. The figure assumes at each landing a hinged door normally closed by a spring. A projection on the door closes its associated door contacts 108 when the door is closed, and opens these contacts when the door is open.

A cam operated member pivots on a stationary support attached to the door frame. Its roller cam projects into the hoistway, in position to be engaged by the retiring cam on the car when the retiring cam is in extended position, but not otherwise. In normal operation, the retiring cam is extended when the car comes to rest at a landing and the car gate opens, but retires when the car gate closes preparatory to the starting of the car, and continues in a retired position until the car again comes to rest at a landing and the car gate opens. When the retiring cam is extended, it rotates the cam operated member on its axis, thereby opening its contacts 83 and moving a locking hook out of engagement with the projection on the landing door, and the landing door may then be manually opened. The car gate cannot start to close until door contacts 108 are closed. The car cannot start unless door lock contacts 83 are closed, and contacts 83 cannot close unless the landing door is locked.

Hence, before the car can start, contacts 108 insure that all landing doors are closed, contacts 83 insure that all landing doors are locked, and gate contacts 84 insure that the car gate is closed. The upper part of Fig. 9 shows the cam in extended position, and the lower part shows the cam in retired position.

Fig. 10 shows the method of contacting for the operation of the circuit arranging device through the use of tapes in the hoistway, instead of through the use of obstructions secured to the guides or hoistway structure. Two arrangements are shown; one at the left with a standing tape and one at the right with a running tape. The latter is assumed to be related to a car beyond that to which the former is related. When the standing tape is employed, it is secured to a vertically adjustable attachment at the top of the hoistway, and it is held taut by a weight or spring at the bottom of the hoistway. A dust shielded and exterior light ray shielded unit including guides for the tape, a source of light, a light sensitive or so-called photo-cell of the self-generating type is mounted on the car. Brushes are included in this unit to keep the tape clean. The tape is opaque and, at proper positions, openings or windows in the tape are provided. When the movement of the car brings a window in position to permit rays from the source of light to impinge upon the photo-cell, a connected electromagnetic relay contacts to operate the circuit-arranging device in the same manner as it would be operated by the contacting of contacts 127 in Fig. 5a. The source of light is energized only while the car is in motion.

With the running tape arrangement, the source of light and photo-cell unit is mounted at the top of the hoistway in such manner as to permit of vertical adjustment. An endless opaque tape with windows is attached to the car, is supported by a free-running sheave above the photo-cell unit and is held taut by a free-running weighted or spring-tensioned sheave at the bottom of the hoistway. The source of light is shown connected through back contacts 29 of the potential switch in Fig. 5a, which switch is closed only while the car is in motion. The source of light in the standing tape arrangement is similarly connected.

In either arrangement, with the windows spaced to correspond with the floor levels for which stopping provisions are made, a single vertical adjustment of photo-cell unit or of tape applying to one direction of car travel adjusts for all associated floors simultaneously. Likewise, a single vertical adjustment of the position of the switch which includes contacts 127 in Fig. 8, adjusts for all associated floors simultaneously.

Fig. 11 shows a plan view of the unit, indicating the guides which insure the positioning of the tape with respect to the photo-cell and the source of light, and Fig. 11a shows a side view of the tape, guides and a window.

It will be evident that more than one vertical line of windows and more than one photo-cell unit may be associated with each tape and that mechanical obstructions on the tape, in cooperation with mechanical switch arms, may be substituted for the windows and photo-cell units.

Fig. 12 shows a face view of a push button and Fig. 12a shows a side view of the push button, in section, in its relations to sources of light and contacts. 89 is a translucent rod. 90 is a translucent shouldered sleeve. 31 is a source of light which illumines one or more sleeves 90 associated with respective buttons in a push button box. 52 is a source of light which, when energized, illumines its associated push button rod 89. The arrow light source of light, when energized, illumines its associated arrow. Landing contacts 34 are closed when the associated self-returning push button is manually pressed. When an intermediate button in the car is manually pressed, an associated cross bar closes both an up and a down set of contacts 53 as shown in gang-switch 32 of Fig. 5. All sources of light are separated by opaque barriers or shields.

Fig. 13 indicates the general detail of the potential switch and associated elements at the top of Fig. 5a. As the pivoted armature is attracted by the energizing of the potential switch coil, the power contacts close, back contacts 109 open, back contacts 29 close, time element contacts 105 immediately open and a time element is released which results in contacts 103 closing at the expiration of about two seconds. When the pivoted armature is released by the de-energizing of the potential switch coil, the power contacts, and contacts 103 and 29 immediately open, contacts 109 immediately close and the other time element is released which results in contacts 105 closing at the expiration of about eight seconds. The use of front and back contacts is well known in the art, and the method of employment of delay elements in connection with contacts 103 and 105 provides a simple means of utilizing the potential switch to provide the necessary mechanical movement but, other than that, forms no part of the invention and, further, is not claimed as a part of the invention.

Back contacts 68 of the direction switches close and open in similar manner to back contacts 29 of the potential switch.

In Fig. 14, insulated metal strips are secured to an extension of the solenoid plunger, and contacts 69 and 63 are open-circuited by the raising of these strips immediately the time element coil is energized. When the coil is de-energized, the return movement of the plunger is delayed by a time element. The solenoid is shown in energized position. Contacts 63 close at the expiration of about eight seconds and contacts 69 close about one or two seconds later, unless the coil is re-energized as soon as contacts 63 are closed, in which latter case the plunger again rises before circuit through contacts 69 is completed.

Referring to Figs. 1 and 2, an insulating cylinder 1 carries metal plates 2, metal strips 3, metal contacts 4, and insulated portions 5. The cylinder 1 is carried on a shaft 9, said shaft being journaled in bearings 10—10 and having a ratchet gear 6 secured to one end thereof. Electromagnets 7 and 8 provide a drive means for intermittently actuating a ratchet mechanism to rotate the cylinder step-by-step in one direction or another. Said ratchet mechanism comprises plungers 11 which have pawls 12 pivoted at their lower ends and restraining hooks 13 co-operating therewith. Contacts 14, 15, and 16 mounted above the magnets 7 and 8 are opened and closed for a purpose to be later described. When an elevator car is approaching a landing, one of the electromagnets is momentarily energized, causing a plunger 11 to rise and lift a pawl 12 to move the cylinder one step to a position corresponding with the landing approached, to first open contact 14, then to open contacts 15 and 16 as the plunger completes its upward stroke.

The restraining hooks 13 are arranged so that each is fulcrumed on its corresponding plunger and is actuated by the opposite plunger to prevent the momentum of the revolving cylinder from rotating past the desired contacting position. A detent pin 17, pressed by spring 18 into detents 21 in the gear 6, holds the cylinder in its delivered position. When the magnet is de-energized, gravity, assisted by spring 22, releases the pawl 12 and hook 13 from engagement with gear 6, closes contacts 16 and 15 and then 14, and presses one pawl 12 outward against a spring 23 and downward on bevel plate 24. The upper limit of the plunger stroke is governed by a stop in the magnet frame, and the lower limit by adjustable nuts 39. Two rows of contact fingers 19 and 20 are provided above and below the cylinder 1 and rest upon either electrical contact or insulated portions, depending upon the position of the cylinder. In Fig. 4, the dotted lines A—B and C—D represent the line of contact of the contact fingers 19 and 20 at one position of the cylinder. The contacting principles are simple, but their effects are sure and far-reaching, and may be understood by reference to Fig. 1 and Fig. 4; the stationary fingers in the former being shown in proper alignment with the plane surface development of cylinder 1 in the latter, and the electrical connections to the stationary fingers being shown in Fig. 5a. These fingers are consecutively connected with respect to the floor positions and lines AB and CD represent the contacting lines of the stationary fingers with respect to the cylinder contacts when the car is at rest at the second floor. The relations of these contacting lines when the car is at any other floor may be followed by reference to the floor indications at the margins of Fig. 4. Thus, the transitions resulting from the jumping of the cylinder may be readily followed. For X drum, intermediate finger 41 is always resting on its drum contact strip: feed finger 37 is always resting on a drum contact plate 2, and the two plates are permanently connected together: the floor fingers may rest on a contact plate 2 or on an intermediate spot 4; if a floor finger is on a contact plate 2 at any time, or is on an intermediate spot 4 while the car is in motion, it connects its floor magnet to negative line; if it is on an intermediate space 4 while the car is at rest, its floor magnet is not connected to negative line and hence cannot be energized. For Y drum, the up and down fingers 54 always rest on a drum contact plate 2 except when the car is at a terminal, when one of them rests on a dead space 5; these fingers 54 connect through their normal limit switches 55 and direction solenoid contacts 56 to their respective direction solenoid coils 57 and 58, and these solenoids determine the direction of car travel. Each floor finger will be resting on a dead space 5 or a plate 2. When the car is at a landing, the finger or fingers corresponding with that landing are on a dead space. All fingers—either up or down—corresponding with floors above, are on a plate leading to the up direction solenoid and all fingers corresponding with floors below are on a plate leading to the down direction solenoid. For Z drum, the two sets of contact spots 4 are respectively connected to their strips 3 and thence through their respective up and down fingers 49 to the stopping means which will be later explained. When the car is at an intermediate floor, the floor finger for the next consecutive floor above it and below it is resting on a contact spot 4, and all other floor fingers are resting on insulation.

Two one-way switches indicated at 127 in Fig. 5a, one for up direction and one for down direction, are mounted on the car and are mechanically actuated by certain obstructions in the hoistway, to provide a means for energizing the jump magnets 7 and 8 in conjunction with the movement of the car.

Referring to Figs. 5 and 5a, for convenience in reference, three groups of cylinder contacts are shown and are designated as X, Y, and Z drums. The contact fingers which rest on X drum are constructed of split spring material and are provided with staggered projections as shown in detail in Fig. 6, which insure against the finger breaking electrical contact with the plate 2 when crossing an insulated portion including an intermediate contact 4, due to the bridging effect of the staggered portions. The contact plates 2 of X drum are always negative. When normally open potential switch back contact 29 is closed, as it is when the car is in motion, every finger on X drum is negative. When the car is at rest, the fingers resting on the X drum intermediate contacts 4 are not negative.

The purposes of X drum and its associated stationary contacts are to prevent the registration of a call for a landing opposite which the car is at rest, to hold intervening calls which are to be refused while the car is in motion in one direction, and to cancel served calls. When the car is at rest at any landing, the stationary finger or fingers resting on X drum and associated with that landing, are resting on their corresponding intermediate spots 4. When the intermediate spots are connected to negative, the floor magnets whose fingers are resting on intermediate spots may be energized, but otherwise they cannot. These intermediate spots are connected through finger 41 to potential switch back contacts 29 which are open when the potential switch is open, and hence the intermediate spots are dead when the car is at rest, as the potential switch, in conjunction with a direction switch, closes to start the car and opens to stop the car. With a potential switch of the flapper type and a shaft secured to the movable armature, on which shaft is an insulation strip and a negative live strip, in conjunction with stationary contact fingers corresponding with the several floor magnets, the same purpose could be served, but the use of the intermediate spots on X drum avoids the duplication of stationary contacts.

The purposes of Y drum are to determine and hold the direction of car travel and to provide for the stopping of the car in response to calls for the direction of car travel opposite to that which has been established; i. e.: if the car is traveling up and the furthest call in advance of the car is a call registered by a down button, up and down stationary fingers 54 connect through their respective normal limit switches 55 and the opposite direction solenoid contacts 56 to their respective direction solenoid coils 57 and 58. There are four alternately connected contact plates 2 on Y drum, with dead spaces 5 between each pair of plates. With the car in motion, and a short distance away from a landing which it is approaching, the drum jumps to a position corresponding with that landing. This brings dead spaces 5 to the stationary fingers corresponding with that landing, and this condition obtains until the drum again jumps as the car approaches an adjoining landing. These fingers connect to contact 43 of their corresponding floor magnets 35, but in reverse direction: i. e.; finger 97 in the contacting line of up finger 54 connects to contacts 43 of the down floor magnet 35, while the opposite first floor finger in the contacting line of down finger 54 connects with contacts 43 of the up first floor magnet 35. The result of this arrangement of drum plates and stationary fingers is that, as the energizing of any floor magnet 35 connects its Y drum finger through its contacts 43, wire 40 and gate protector magnet contact 38 to the negative side of transformer 30, that finger will continue this connection of the negative line to either up direction solenoid 57 or down direction solenoid 58 unless the finger is on a dead spot 5 or the circuit is open at a normal limit switch contact 55 or a direction solenoid non-interference contact 56; thus providing for the purposes in the attainment of the sure operation of the system as will be later detailed.

The purpose of Z drum is to provide for the stopping of the car in response to calls for the established direction of car travel and it operates in conjunction with duplicating, secondary and delay magnets 82, 87, and 74 to secure the same accuracy as that obtained through the action of Y drum. The actual stopping of the car is accomplished by disrupting the circuit to elevator motor 123 at the contacts of the potential switch, but the opening of the energizing circuit through the potential switch coil is accomplished through the combination of Y drum and one of the direction solenoids 57 or 58 or through the combination of Z drum and duplicating magnet 82. As between the two methods of stopping, the relation of drum jumps both as to car position and time is a constant; the time action of the potential switch is a constant, and as the time action of either of the direction solenoids and of the duplicating magnet is identical, this action is also a constant. Slow-down devices may be introduced with initiating and final stop movements, but I have avoided cumbering the description with detail.

The two stationary fingers 135 and the correction feed finger 136 at the extreme left of the drum cylinder in Fig. 5a co-operate with strip 3 at the extreme left of Fig. 4. Their purpose is to correct the position of the cylinder with respect to the position of the car in the hoistway, as will be later explained.

In conjunction with the the floor magnets and other electro-magnets except the elevator motor drive circuit magnets, a contracting arrangement on the order of telephone contacting is employed in which the energized stroke of the plunger opens all normally closed contacts and closes all normally open contacts as shown in relation with its individual magnet or plunger.

Figs. 5–5a show the connections for a six floor and basement apartment house elevator. Beginning with the upper lefthand corner normally closed inspector's switch 27 is at the controller and is manually opened only when an inspector wishes to operate the elevator from the car without interference from the push buttons at the landings. L represents push buttons at the landings. Landing door contacts 108 represent a series of contacts—one set at each floor—the series circuit being open when any landing door is open and closed when all landing doors are closed. The landing doors are opened manually and closed by a spring. The landing door lock contacts 83 represent a series of contacts—one set at each floor—the series circuit being open when any landing door is unlocked and closed when all landing doors are locked. Each landing door is automatically unlocked as the car comes to rest at its landing and is automatically locked before the car leaves the landing. 32 represents the case or gang switch containing the control buttons and other control elements and the signal elements in the car. Manually operated emergency switch 112 permits of stopping the car or of preventing its operation. If it is opened while the car is in motion, the car immediately stops, but the opening of emergency switch 112 does not cancel any calls which may have been registered. When emergency switch 112 is again closed, the car starts and serves registered calls. The alarm button is merely a button connected to a bell within hearing of the superintendent of the building, to indicate that his presence is desired. A series of contacts 53 represents the contacts of push buttons corresponding with the several floors. These contacts 53 are connected with their corresponding contacts 54 at the landings. If the car button pressed corresponds with an intermediate floor, both the up and the down button contacts for that floor close simultaneously. Corresponding with each push button is a lamp 47, and as each button has a translucent center, the energizing of its corresponding lamp illumines the button, making it visually responsive. 101 represent up and down arrows which, when illumined by their respective lamps, indicate the direction in which the car is traveling or is set to travel. Gate switch 84 is on the car and its contacts are closed just as the closure of the car gate is effected, and are opened just as the car gate starts to open. The car cannot start while contacts 84 are open, and if the car is in motion it will immediately stop if contacts 84 are opened. The car gate is opened and closed by an automatic device on the car. Final limit 113 is mounted on the car and its normally closed contacts are opened by the final limit striking a cam mounted in the hoistway just beyond the normal limits of car travel. The opening of this final limit will immediately stop the car and it cannot again be started until it has been manually moved a sufficient distance to bring the final limit out of contact with the hoistway cam which has caused it to open. Low voltage transformer 46 supplies current for the car responsive lamps 47 only. Its use is a convenience to permit of employing long life miniature lamps. Transformer 30 supplies current for all magnet energizing circuits. These latter are customarily operated on somewhat lower voltage than the line voltage, and the use of a separate transformer isolates the control circuits from the power supply circuits, which latter are usually grounded on one leg. Phase reversal switch 25 is provided to prevent operation should one phase of the power circuit be reversed, as the elevator motor 123 and the gate motor 122 would then operate in the wrong direction. The potential switch closes and opens the power circuit to the elevator motor 123. The accelerating switch short circuits starting resistance. The up direction switch and the down direction switch determine the relation in which the legs of the power circuit shall be connected to the elevator motor 123, and hence its direction of rotation when energized. The potential switch and one direction switch close and open to start and stop the elevator motor 123. Normally closed thermal overload switch 26 opens if continued excessive current passes to the multi-phase elevator motor 123—usually as the result of the blowing of a fuse, which would leave only one phase connected to the elevator motor 123. The magnetically operated friction brake on the elevator motor shaft is energized and released when the potential switch is closed, and de-energized and applied when the potential switch is opened. Potential switch back contacts 29 are open when potential switch is open, and back contacts 109 are closed when the potential switch is open, and vice versa. The potential switch is represented as being of the flapper type with extended arms on the movable armature which operate time elements 105 and 103 respectively. When the potential switch closes time element contacts 105 simultaneously open. When the potential switch opens, a time element delays the closing of contacts 105 until the expiration of about eight seconds. This prevents the re-starting of the elevator until that time has expired. When the potential switch closes, another time element is permitted to start to operate, but its associated contacts 103 do not close until the expiration of about two seconds, when an energizing circuit is thus completed to the accelerating switch coil to short circuit the starting resistance in the power circuit to elevator motor 123. Contacts 103 open simultaneously with the opening of the potential switch. The gate motor protector 121 is a solenoid which operates against a dash-pot to open normally closed contacts 38 after the expiration of a predetermined time period. If this time is not exceeded, contacts 38 are not affected. One of the objects of the gate motor protector is to prevent burning out of torque type gate motor 122 in the event of the gate meeting with an obstruction while closing and thereby keeping current on the motor for an excessive period; however, the opening of contacts 38 also cancels all registered calls. Gate motor 122 is attached to a mechanism which is mounted on the car and which closes and opens the car gate, and which moves a retiring cam on the car which co-operates with the lock at each landing door and its associated landing door lock contacts 83, as the car comes to rest at a corresponding landing and the car gate starts to open, and also as the car gate closes preparatory to the car starting to serve another landing. This mechanism also operates close limit 106 and open limit 116 mounted on the mechanism. Up and down contacts 127 of switch on car 125, mounted on the car, are actuated by lightweight members which mechanically contact with stationary obstructions in the hoistway, to operate up and down jump magnets 126 at the controller, which, in turn, provide step-by-step rotary motion of the X, Y, and Z drum cylinder. Variable binding posts 137 indicate the position in the circuit at which a later described load compensator or similar purpose device is connected, when employed. Electrical connections to the car are by means of the customary flexible cable. The movement of arm 70 of the parking switch, which switch may be located at any convenient position, provides for the return of the car to any floor, after all other calls are served, or of eliminating any parking action, and its connection through time element contacts 69 prevents unnecessary stopping of the car at the parking floor in transit, as the car in transit to another floor will stop at the parking floor only if a button corresponding with the parking floor has been pressed. As the result of the connection of the time element solenoid coil to direction solenoid contacts, normally closed time element contacts 63 are immediately opened on the energization of up direction solenoid 57 or down direction solenoid 58, and remain open until about eight seconds after the direction solenoid has been de-energized, thus providing for a time interval between reversals or before re-energization of a direction solenoid can occur. Time element contact 69 closes after contact 63 closes, but if a registered call is in evidence at the time that contact 63 closes, the time element coil is re-energized before contact 69 has an opportunity to close. Duplicating, secondary and delay magnets, respectively 82, 87, and 74, co-operate with Z drum to stop the car in response to calls for the established direction of car travel. Up direction solenoid 57 and down direction solenoid 58 co-operate with Y drum to determine and hold the direction of car travel and to stop the car in response to calls for the direction of car travel opposite to that which has been established. Up and down responsive magnets provide for the proper connections to the responsive lamps 47 which illumine the push buttons in the car. Close gate magnet 102 and open gate magnet 115 provide for the closing and opening of the car gate. With the car at rest at a landing, the car gate is open and the landing door is unlocked. If the latter is opened, the car cannot start until it is closed. On registration of a call for another landing, the car gate automatically closes, the landing door is automatically locked and the car starts. On serving a landing, the car stops, the car gate is automatically opened, the landing door is automatically unlocked, and the car cannot again start until the expiration of a pre-determined time period. If calls for other floors have also been registered, and no one enters or leaves the car at the served landing, at the expiration of the time period the car gate automatically closes, the landing door is automatically locked and the car proceeds to respond to another registered call.

Up and down panel magnets 124 act as intermediate elements between switch on car 125 and jump magnets 126. In some cases, the jumping of the latter has been effected directly from the contacting of the former, but the panel magnets were introduced as they are quick acting relays with self-holding contacts, which insure the complete movement of the drum cylinder in response to a very brief contacting at switch-on-car 125. Up and down normal limit switches 55 stop the car at terminals independent of the cylinder drums, but permit the car to leave the terminal in the opposite direction. Up and down correction switches 134 co-operate with correction fingers 135 at the drum cylinder to correct, if necessary, the position of the drum cylinder with respect to the position of the car in its hoistway. The contacts of each normal limit switch and corresponding correction switch are mounted on the same arm of a lever mounted on the car, which lever engages with a stationary cam in the hoistway when the car reaches a terminal. When the normal limit contacts 55 open, the correction switch contacts 134 close. The X, Y, and Z drum cylinder is rotated in a step-by-step movement by jump magnets 126. Up and down floor magnets 35 are energized by the pressure of their corresponding push buttons and, in co-operation with their associated contacts and the drum cylinder, supply the medium through which the system is operated. In normal operation, the pressure of any push button at any time, except when the car is at rest at the corresponding landing, results in the corresponding floor magnet being energized and a call being registered, which registration will be maintained until the call is served. It will be observed that for a total of nineteen selective control stations—two directional stations at each intermediate landing and single directional station at each terminal landing, and seven stations in the car—but twelve floor magnets are required. One transformer 30 furnishes current for the control circuits. Its positive connection first passes through contact 25 of a phase reversal protecting switch which functions on the well known motor principle. Said contact 25 is normally closed with current on the main line and phases in the proper relation. With line current off or any phase reversed, the contact 25 opens.

The circuit then passes to normally closed contact 26 of the thermal overload switch, which is also well known. Continued excess current in the elevator motor, usually from overload, or failure of one phase, causes a heat reaction which results in opening of the contact 26.

Following this circuit to normally closed inspector's switch 27, we find that manual opening of 27 prevents operation from the landings indicated at L, while still permitting operation from the car or controller. Wire 28 supplies all positive connection to push button boxes at landings. Typical intermediate and terminal landing connections are shown on the first floor and basement landings. The push buttons are of the responsive type described in my Patent 1,823,319, which are both visually responsive when pressed and are continuously visible under all conditions, even in darkness. A lamp 31, constantly energized below normal candle power, provides visibility for the push button which is only noticeable in the dark, and not in the presence of ordinary hall-way illumination. In some buildings, the halls are very poorly lighted or the burning out of an electric globe leaves the hall in darkness, and the above provision permits of readily locating the elevator push buttons. The central part of the push button becomes brightly illumined when lamp 33 is energized, which circuit will be later described.

Referring to Fig. 5 and Fig. 5a, I will now trace the push button circuits from the first floor landing whose connections are typical of all intermediate landings. With inspector's switch 27 in normally closed position, on pressure of the up button, circuit would pass from wire 28 through upper contacts 34, up first floor magnet coil 35 to X drum finger 36. As previously pointed out, if at this time finger 36 rests on its intermediate spot 4 of Fig. 4, and the car is at rest, it is at rest at the first floor and the circuit cannot be completed to negative line, as the intermediate spot connects through its contact strip with intermediate finger 41 to back contacts 29 of the potential switch, which contacts are open when the car is at rest. Had the car been at rest at any other landing, finger 36 would have been resting on plate 2, which is connected through feed finger 37 and gate motor protector contacts 38 to the negative side of transformer 30. Had the car been in motion, potential switch back contacts 29 would have been closed, and there would have been a connection to negative line through any floor finger on X drum.

On pressure of the down button at the first floor landing, circuit would pass from wire 28, through lower contacts 34, down first floor magnet 35 to the first floor X drum finger opposite finger 36. From here, the circuit conditions to negative line would be the same as just described in relation to X drum finger 36.

At the terminal landings there is but one button; that at the sixth floor corresponding with sixth floor up floor magnet 35, and that at the basement corresponding with basement floor down floor magnet 35.

From the above, it will be seen that in normal operation, any floor magnet will be energized by the pressure of its corresponding landing button, except when the car is at rest at that landing, and if the car is in motion and comes to rest at any landing, the floor magnet or magnets 35 corresponding with that landing would be de-energized.

With inspector's switch 27 open, no floor magnet can be energized from any landing, and if any floor magnet is energized and inspector's switch 27 then opened, said floor magnet 35 would be immediately de-energized unless its corresponding push button in the car is manually held in closed position.

I will now trace the circuits of the operative push buttons in the car. When inspector's switch 27 is in its normally closed position, wire 28 is connected to every pair of push button contacts 53 in the car. The other side of each pair of contacts 53 is connected to its corresponding floor magnet as in the case of the landing push buttons. The pressure of any intermediate button in the car simultaneously closes the two pairs of associated contacts 53 and hence connects to both the up and the down floor magnets corresponding with the button pressed, with results which would coincide with the simultaneous pressure of both the up and down buttons at the first floor landing, as previously described. Corresponding with the terminal floors, only one pair of contacts 53 is affected by the pressure of a terminal floor button in the car. With inspector's switch 27 open, the positive side of transformer 30 is still connected through phase reversal switch 25 and thermal overload switch 26 and wire 64 to push button contacts 53 in the car, and the car can therefore be operated by pressure of the car buttons without interference from the landings, but continued manual pressure must be maintained.

The methods of energizing and de-energizing the floor magnets have been described, and we now come to the results of these actions. Associated with each floor magnet 35 are four pairs of normally open contacts, 42, 43, 44, and 45. When any floor magnet 35 is energized, its four pairs of associated contacts are closed. Referring to those associated with the first floor up and down floor magnets 35, whose connections are typical of those of the contacts of all intermediate floor magnets, we find that the closing of contacts 42 of the first floor down magnet 35 connects the negative side of the coil of that magnet to first floor finger 66 of Z drum, and that of the first floor up magnet 35 connects the negative side of the coil of that magnet to the first floor finger on the opposite side of Z drum, and that these two fingers are out of vertical alignment to the extent of two spaces. The closing of contacts 43 of the down magnet, connects a wire which is common to all floor magnet contacts 43 to first floor finger 97 of Y drum and of the up floor magnet to the opposite first floor finger of Y drum. The aforesaid common wire is connected through wire 40 and gate motor protector magnet contact 38 to the negative side of transformer 30. The closing of contacts 44 associated with the down floor magnet connects a wire which is common to all floor magnet contacts 44 to corresponding contacts 48 of the down responsive magnet 51, and of those associated with the up floor magnet to corresponding contact 48 of up responsive magnet 51. This aforesaid common wire is connected to the negative side of low voltage transformer 46. The closing of contacts 45 associated with first floor down magnet 35 connects the positive side of the coil of that magnet through the corresponding down first floor landing button illumining lamp 52, to wire 28, and the closing of contacts 45 associated with the up floor magnet 35 connects the positive side of that coil through the corresponding up lamp 52 of the first floor landing button, to wire 28. The connections from the contacts associated with the terminal floor magnets differ only in that the closing of contacts 44 connects the common wire directly to the corresponding push button illumining lamp 47 in the car, and thence to the positive side of low voltage transformer 46, as may be traced by reference to the contacts associated with down basement floor magnet 35. Thus, contacts 42 provide for relating an energized floor magnet to Z drum, contacts 43 for relating to Y drum, 44 for relating to the illumining lamps—which I have termed responsive lamps—in the car, and contacts 45 for providing a holding circuit for the associated floor magnet coil after pressure on the push button has been removed, and at the same time illumining and causing to be visually responsive, the landing button whose manual actuation caused the corresponding floor magnet to become energized. Simultaneously with the illumining of the hall button, the corresponding push button in gang switch 32 in the car is illumined by its lamp 47, provided the landing button pressed was at a terminal or was for the direction in which the car was traveling or was set to travel. If it was for the opposite direction and corresponded with an intermediate floor, its illumining would be delayed, as will be hereafter explained. The pressure of a terminal push button in the car would result in the illumining both of itself and the corresponding landing button. The pressure of an intermediate push button in the car would result in the illumining of itself and both the up and the down buttons at the corresponding landing. All corresponding push buttons are darkened when a call is served.

Directional fingers 54 on drum Y connect through corresponding normal limit switches 55 and direction solenoid criss-cross contact 56 to the negative sides of their respective direction solenoid coils 57 and 58; whose positive sides, when de-energized, are connected through contact 61 or resistance 62, time element contact 63, wire 64, contact thermal overload switch 26 and contact phase reversal switch 25 to positive. With the system normal, the registering of an initial call from any push button, which involves the energizing of a floor magnet 35, will cause direction solenoid 57 or 58 to become energized, and determine the direction in which the car will travel. Once energized, corresponding self-holding contact 65 will connect to positive through wire 64, irrespective of time element contact 63, and the solenoid will remain energized until its circuit is interrupted at its normal limit switch 55 or at Y drum. Examination of Fig. 4 will make clear that with the car at rest at any landing, an initial call resulting from the pressing of either an up or a down button corresponding with any other landing, will cause that direction solenoid to be energized whose action is necessary to determine the direction in which the car shall travel to serve the calling floor. Once energized, the opening of its criss-cross contact 56 eliminates the opposite direction solenoid from consideration until de-energization occurs. Further examination of Fig. 4 in conjunction with Fig. 5–5a will make clear that reversal cannot take place until the furthest call—for either up or down—in the established direction has been served; that any intervening calls for the direction opposite to that which has been established will be disregarded and that the stop to serve the furthest call, if for the direction opposite to that which has been established, will result from the de-energization of the direction solenoid. The explanation is that with the car opposite any landing, all Y drum contact fingers corresponding with any landing above that position will be resting on a drum contact plate connected to the up direction solenoid; and those below, will be resting on a Y drum contact plate connected to the down direction solenoid; and that, in the absence of other means for stopping, the car will continue its travel until the periodic jumping of the drum has brought the drum out of electrical contact with the furthest live contact finger or fingers.

Stops for the established direction of travel are determined by Z drum. When Z drum is in a position corresponding with a terminal landing, a Z drum finger 66 corresponding with the next landing is resting on its Z drum contact and, when Z drum is in a position corresponding with any intermediate landing, a Z drum finger 66 corresponding with each of the next landings above and below the car position is resting on its respective Z drum contact. In either case, all other Z drum fingers 66 are resting on the insulated part of Z drum. With a call registered for the established direction of car travel and the car started or in continued motion toward the calling floor, a circuit will be established from the negative side of the energized floor magnet, through corresponding contact 42 and its Z drum finger 66 and directional contact finger 49, corresponding wire 67 or 50, direction switch back contact 68, wire 71, panel magnet contacts 72, wire 73, delay magnet coil 74, wire 64, thermal overload switch contacts 26 and phase reversal switch contacts 25 to positive. Thereupon, delay magnet 74 will be energized one floor in advance. Current will then flow from negative through wire 75, jump magnet contacts 16, delay magnet contact 77, secondary magnet contact 78, jump magnet contacts 15 and duplicating coil 82 and wire 64 and thermal overload switch and phase reversal switch contacts 26 and 25 to positive. Current will then flow from negative, through wire 75, landing door contacts 83, car gate switch 84 which is closed when car is in motion, delay magnet contact 85, duplicating magnet contact 86, secondary magnet coil 87 and wire 64 to positive.

Contacts 88 associated with each of the three magnets just mentioned are in the circuit which energizes the potential switch and direction switches controlling the current to the elevator operating motor. As just described, contact 88 at the delay magnet was first opened, then contact 88 at duplicating magnet 82 was closed, and then contact 88 at secondary magnet was opened. The continuity of the circuit which is energizing the potential switch and one of the direction switches now depends upon contact 88 at the duplicating magnet. Just before the car reaches the landing at which a call for the established direction of car travel is registered, the drum jumps, one of the jump magnet contacts 16 is momentarily opened, duplicating magnet 82 is de-energized and its contact 88 is opened, interrupting the above mentioned energizing circuit and bringing the car to rest at the calling landing. Contacts 91 are self-holding contacts of their respective delay, duplicating and secondary magnets. Mechanical interference 92 prevents the delay magnet from dropping until after the secondary magnet 87 has dropped, which latter does not drop until gate switch 84 opens as a result of the opening of the car gate.

An example will illustrate that there can be no confusion in the stopping in response to calls for the established direction of car travel and calls for the direction opposite to the established direction of car travel. Assume the car to be at rest at the second floor, with no calls registered. Z drum fingers 66 corresponding with the first and third floors are on their respective Z drum contact spots. Now assume that a down call is registered at the first floor. When the down direction switch closes to start the car toward the first floor, its back contact 66 closes and the three magnets operate as described in the previous paragraph. As Z drum jumps on the approach of the car to the first floor, the car comes to rest at that floor. The contacting of the third floor finger 66 with its Z drum contact spot had no effect, as the back contact 68 of the up direction switch remained open. If the call had been registered at the basement instead of at the first floor, the car would have continued to the basement and the contacting of Z drum first floor finger 66 would have had no effect, as first floor magnet contacts 42 would have been open. The stopping action at the basement would have been brought about by the contacting of the basement Z drum finger 66 with its Z drum contact spot 4 as the drum jumped on approaching the first floor. Had the call been registered at the third floor instead of at the first floor or basement, the car would have traveled to the third floor. Now let us return to the original condition of the car being at rest at the second floor with no calls registered, and let us register a call from the up button instead of from the down button at the first floor. For the car to respond, it must again be the down direction switch that closes even though an up button was pressed, and its corresponding back contact 68 closes. However, the contacting of Z drum first floor finger 66 with its Z drum contact spot would now have no effect, as the first floor down floor magnet 35 is not energized and its associated contacts 42 are open. We must look elsewhere for provision to stop the car at the first floor: namely, to Y drum. The first floor up floor magnet 35 was energized by the pressure of the first floor up button, but the position of Y drum at that time brought the plate 2 connected to down direction solenoid 58 in contact with the first floor Y drum contact finger connected to first floor up floor magnet contacts 43, and it was the closing of these contacts 43 when the floor magnet was energized, that caused the elevator to start and continue to run. As the car approaches the first floor, the drum jumps, and brings a dead space 5 under the first floor finger, which de-energizes the direction solenoid and stops the car. It will be remembered that the floor magnet is not de-energized until potential switch back contact 29 opens as the car is brought to rest. Had the car been at the third floor when the up first floor button was pressed, the car would not have stopped at the second floor, as the first floor finger would have still been on plate 2 of Y drum after the drum had jumped as the car approached the second floor. Had the car been at the sixth floor when the first floor up button was pressed, and immediately thereafter, the fifth, fourth, third and second up floor buttons had been pressed, the car would not have stopped until it reached the first floor, even though the intervening jumps of the drum would have successively brought first a dead spot 5 and then the Y drum plate 2 leading toward the opposite direction solenoid to the Y drum fingers of the four intervening floors, for the intervening dead spaces would have had no effect as just explained, and the opposite direction plates 2 would have had no effect, as the opened contacts 56 of the energized down direction solenoid 58 would have prevented the energizing of up direction solenoid 57. Had there been down calls registered at any of these four intervening floors, they would have been served through the action of Z drum and its associated magnets, but the down direction solenoid would not have been de-energized in serving them, and such intervening calls would have been cancelled, as served, through the positioning of X drum and the opening of potential switch back contacts 29 as the potential switch opened to bring the car to rest. Had both an up and a down call been registered at any of these intervening floors, the floor would have been served through the action of Z drum and its associated magnets, but the down direction solenoid would not have been de-energized in serving it, and both the up and down calls for that landing would have been cancelled, through the position of X drum and the opening of the potential switch back contact 29 as the potential switch opened to bring the car to rest.

It will thus be seen that the initial call establishes the direction of car travel, whether from a landing or from the car, and that that direction will be toward the calling floor; that all calls for the established direction of car travel will be served on the first approach of the car; that the furthest call for either direction in the established direction of travel will be served before reversal occurs; that intervening calls for the direction of car travel opposite to that which has been established will be refused on the first approach of the car; that all registered calls will be held until served; that a call may be registered at any time, either from a landing or from the car, except when the car is at rest at the landing for which a button is pressed; that, on the registering of any call from any landing, the push button pressed becomes responsively illumined and glows, and continues to glow until the call is served; that the corresponding push button in the car also immediately glows provided the call is for a terminal landing or for the established direction of travel and that, if for the opposite direction and corresponding with an intermediate floor, the responsive glow of the car button is delayed until reversal of direction takes place; that the pressure of any car button for a floor other than that at which the car may be at rest, responsively illumines the corresponding landing button, or both corresponding landing buttons if for an intermediate floor, and is itself immediately illumined if for a terminal landing or for the established direction of car travel, and its illumining is delayed until reversal takes place if for the opposite direction of travel; that all registered calls are held until served, that all corresponding buttons are darkened when a call is served; and that no confusion nor false stops can occur, irrespective of the number of calls registered, the sequence in which they are registered, the rapidity with which they are registered, or from the simultaneous pressure of buttons at different landings or at landings and in the car.

In automatic operation, exactness in timing and the positioning of parts is of the utmost importance. The dropping of a direction solenoid accomplishes stops opposite to the established direction of travel, and the dropping of the duplicating magnet accomplishes stops for the established direction of travel. The de-energizing of either is accomplished by the exact functioning of the circuit arranging device whose action is in 1:1 relation with the motion of the car, and is independent of such occurrence as stretch of ropes or slippage. Compactness and uniformity of operation result from the principle and construction of the controlling mechanism and, in practice, the periphery of the drum moves one-quarter of one inch for each stop, irrespective of whether the distance between succeeding stops is a few feet or many times that distance, and advantage is taken of a circumferential surface as compared with the same lineal path on a plane surface. It will be understood that with structure to correspond, the step movement is not necessarily limited to one quarter of an inch, nor the cylinder to any specific dimensions.

When either panel magnet 124 is energized by the momentary electrical contacting of its corresponding switch on car 127, through the mechanical contacting with an obstruction in the hoistway as shown in Fig. 8, its corresponding jump magnet is energized. The energizing circuits may be traced from negative through switch on car contact 127, corresponding panel magnet 124, wire 64, thermal overload switch contacts 26 and phase reversal switch contacts 25 to positive. Panel magnet contacts 128 and 131 are then closed, and current passes from positive through contact 128, jump magnet 126, contact 131 and resistance 132 to negative. Owing to the difference in the action between alternating current magnets and direct current magnets, resistance 132 is not required when direct current magnets are employed. The value of resistance 132 lies in its automatic co-operation with the action of the energized jump magnet. With the jump magnet plunger in normal position, the electrical impedance of the magnet coil is comparatively low and hence, in the absence of any interference, a considerable value of energizing current would flow; but the electrical impedance of the coil increases as the plunger rises. It is desirable that the upward movement of pawl 12 in Fig. 2 should not be too rapid prior to its leaving the surface of bevel plate 24 and engaging with a tooth of gear 6, and that as the momentum effect of the upward moving mass is absorbed in overcoming the inertia of the cylinder 1 after such engagement, the pull of the jump magnet shall increase to rotate the cylinder to the completion of its step movement. It will be evident that with the introduction of resistance 132 in series with the coil circuit, the voltage across the resistance terminals is greatest, and the voltage across the coil terminals is least, when the maximum current is flowing in their series circuit, and that the voltage across the coil terminals increases as the plunger's rise reduces the impedance of the coil. Panel magnet contact 133 establishes a self-holding circuit through jump magnet contacts 16. This insures the full stroke of the jump magnet, even though switch on car contacts 127 open before the stroke is completed. A quick acting panel magnet or relay thus becomes the only requisite for practical application of the principle, irrespective of the mass or friction involved in the circuit arranging device. For so low a speed as 100 feet per minute, the time required for the elevator car to travel one inch is approximately only 1/20th of one second, and elevators are now operated as high as 1400 feet per minute. For low speeds and a small number of stops, I employ a strip of light clock spring as the actuating lever on the car for closing the switch on car contacts and for high speeds or a large number of stops I employ a source of light and a photo-cell in conjunction with an opaque tape. Properly located perforations in this tape or light barrier permit the light to pass through these perforations or windows, and there is no appreciable time lag in the functioning of the photo-cell. The vertical length of the windows is made as long as required for the operation of a relay functioned by the photo-cell, but the timing of the initial passage of the light beam is exact. The close proximity of the source of light and the photo-cell, and the protection from dust or film made possible by this construction, insure the efficient and continued uniform functioning of this device, where other attempts at photo-cell operation have proved unsatisfactory. When I employ a vertically adjustable suspended standing tape, I locate the source of light and photo-cell on the car. When I employ a running tape, kept taut by an idler at the bottom of the hoistway, I conveniently locate the vertically adjustable source of light and photo-cell unit at the top of the hoistway. In either case, a single adjustment adjusts for all landings, and the positioning of the controller is in no wise affected. The complete independence between hoistway position and controller or selector position is of great importance. Insofar as the other features of my system are concerned, the direct or indirect operative influencing of panel magnet 124 by induction, unbalancing of magnetic or electrical paths or other means may be employed, but for simplicity or speed I prefer the two methods described. When either panel magnet 124 is energized, its four pairs of associated contacts operate in sequence from the bottom up, and when it is de-energized, open in sequence from the top down. Immediately after the self-holding contacts 133 are closed, the self-holding circuit to negative is completed through wire 75, either through contacts 127 on the car or through jump magnet contacts 16 on the controller. If contacts 127 open before the drum has completed its stroke, contacts 16 assure that the stroke will be completed, as the opening of contacts 16 is mechanically dependent upon such completion. If contacts 16 open before contacts 127 open, the jump magnet 126 remains in raised position until contacts 127 open, but the exact timing of the stop is in no wise affected, as jump magnet contacts 15 open simultaneously with contacts 16, and the circuit through duplicating magnet coil 82 is thereby opened. As has been explained, secondary magnet 87 does not drop until the potential switch has opened and car gate switch 84 opens, and delay magnet 74 cannot drop until secondary magnet 87 has dropped, so duplicating magnet contacts 88 are opened and their car stopping effect completed before contacts 88 of the secondary and delay magnets are closed by the dropping of the two latter magnets. Therefore, there can be no interference with uniform stopping or with proper functioning, irrespective of the speed of any magnets concerned.

Of the contacts actuated by the direction solenoids, 56 is the criss-cross to the opposite solenoid, 65 is the self-holding contact, 93 establishes the relation between the potential switch and the corresponding direction switch, 94 connects the circuit through the several safety devices to the established combination, 95 connects the arrow lights in the car and at the landings, and 96 energizes the coil of the time element which actuates contacts 63 and 69.

In response to the initial registration of a call, the corresponding floor magnet 35 closes a circuit from negative through contact 38 of gate motor protector, wire 96, floor magnet contact 43, corresponding Y drum finger 97, corresponding directional finger 54, normal limit switch 55, opposite direction solenoid contact 56, direction solenoid coil 57, contact 61 or resistance 62, time element contact 63, wire 64 and thermal overload switch contacts and phase reversal switch contacts 25 to positive. The normally open contacts of the direction solenoid close, the arrows 101 are illumined, close gate magnet 102 is energized and as soon as the closing of the car gate closes gate switch 84, the elevator starts, and accelerates to full speed when accelerating time element contact 103 closes. With but one call registered for the direction of car travel in which the car must travel to respond to that call, the direction solenoid and the duplicating magnet will drop simultaneously when the call is served. With a multiplicity of calls registered for the established direction of car travel, the direction solenoid will remain energized until the furthest call is served, and the intervening stops will occur through the actuation of the duplicating magnet.

Direction solenoid contacts 61 and resistances 62 are employed only with alternating current magnets, as they are not required with direct current magnets. A pivoted mechanical butterfly 104 is provided to prevent both direction solenoids from being raised at the same time, through the interference of the upper extensions, and the lower extensions insure the last raised direction solenoid rising in the event of current being established through both direction solenoids simultaneously. Should an intending passenger at the fifth floor, desiring to go to the sixth floor, register an initial call which was followed by a call from the basement, the car would serve the fifth floor call and the direction solenoid would drop, but, due to the functioning of the time element controlling contact 63, the opposite direction solenoid could not be immediately energized. The passenger would enter the car and press the sixth floor button and the sixth floor would be served. In the absence of provision to the contrary, the car would have traveled to the basement and then to the sixth floor—a distance of eleven floors instead of the one floor.

The potential switch controls the starting and stopping of the elevator motor, and also mechanically actuates the time elements controlling contacts 105 and 103. When it closes, contact 105 opens, and when the potential switch opens, a time interval elapses before contact 105 closes; thus determining the time which must elapse before another start can occur. When the potential switch closes, contact 103 closes after the expiration of a time interval; thus determining the action of the accelerator switch. Time element contact 63 opens promptly with the rising of either direction solenoid, but closes only at the expiration of a time period after either direction solenoid has dropped; thus determining the time between reversals. Gate motor protector contact 38 opens only in the event of the closed gate magnet remaining in energized position for a predetermined period; the equipment being thus protected in the event of the car gate being obstructed when attempting to close.

When a direction solenoid drops, it comes to rest on one of the lower projections of butterfly 104, whose opposite projection then exerts a horizontal pressure against the washer on the lower end of the plunger of the opposite solenoid. Its contact 61 remains closed and all of its other contacts are in normal position. If, when time element contact 63 closes, registered calls in both directions result in the application of current to both direction solenoid coils simultaneously, the shorter magnetic air gap of the solenoid whose plunger rests on the butterfly projection causes it to rise more quickly than the opposite solenoid and open the circuit to the latter's coil, provided direct current solenoids are employed. With alternating current solenoids, the air-gap difference is supplemented by resistance 62 which is short-circuited by contact 61 in the case of the plunger resting on the butterfly projection, but which is not so short-circuited in the circuit to the opposite solenoid. When reversal takes place, current is applied only to the opposite coil and its plunger rises, and the other plunger drops to the lowest position. It will be understood that either the shorter air gap or the reduced electrical resistance method may be employed in conjunction with butterfly 104 when the direction solenoids are operated by direct current. When the direction solenoids are operated by alternating current, the two methods are used in combination. The reason is that with alternating current directed to the two solenoids simultaneously, the electrical impedance of the coil whose plunger is in lowest position would be lower than that of the coil of the other solenoid and hence, more energizing current would flow through it, which would tend to defeat the objective. Hence, the electrical resistance is added to counteract this tendency.

The positive side of responsive magnets 51 is permanently connected to wire 64, and the negative side to the negative of the corresponding direction solenoid. Each responsive magnet is therefore energized and de-energized simultaneously with its corresponding direction solenoid, and its associated contacts will be closed and opened accordingly. Therefore, car push buttons corresponding with registered intermediate calls for the established direction of car travel will be illumined immediately, while for the opposite direction, their illumining will be delayed until reversal takes place. The function of the responsive magnet contacts has been described.

Close gate magnet 102 is energized from negative through potential switch back contact 109, close limit switch 106 of the gate operating device mounted on the car, time element contact 105, close gate coil 102, open gate contact 107, direction solenoid contact 94 when either solenoid is energized, landing door contacts 108, governor switch 111, emergency switch 112, final limit 113, open gate contact 114, wire 64, and thermal overload switch contacts 26 and phase reversal switch contacts 25, to positive. Among other conditions, the initial energizing of close gate magnet 102 is thus dependent upon the potential switch being open, the landing door contacts closed and one of the direction solenoid magnets being energized. When close gate magnet 102 is thus energized, its contacts 117 permit the energizing of close gate magnet 102, its contacts 119 short circuit time element contacts 105, its contacts 118 provide for the energizing of gate motor protector 121 and its two upper pairs of contacts provide for the operation of gate motor 122 in the direction necessary to close the car gate. The car gate starts to close and as it is completing its closing movement, it closes gate switch contacts 84, and the gate operating mechanism moves its associated retiring cam to lock the door of the landing at which the car is at rest and also causes close limit 106 to open. On the closing of door lock contacts 83 and gate switch contacts 84, circuit is completed from negative to the potential switch and one of the direction switches and the car starts and, on the closing of the potential switch, its back contacts 109 and time element contacts 105 opened, and close gate magnet 102 was de-energized. It will be noted that this de-energizing occurs as a result either of the opening of potential switch back contacts 109 or close limit 106, and the latter is included merely as a convenience in adjustment. Further, it will be noted that the close gate magnet cannot be again energized until the reopening of the potential switch has released the time element associated with contacts 105 and allowed these contacts to close at the expiration of the time period.

Close gate contact 118 energizes gate motor protector 121, which is dash-pot-retarded in the opening of contact 38. This is adjusted to afford ample time for the closing of the car gate by gate operating motor 122, which is a torque motor, and when close limit 106 opens the circuit to the close gate magnet opens, but in the event of obstruction to the car gate, limit 106 does not open, the time period is prolonged and motor protector contact 38 opens, thus dropping the control magnets including the close gate magnet. The above mentioned circuit through contacts 118 may be traced from negative, through contacts 118, gate motor protector coil 121, wire 64, thermal overload switch contacts 26, phase reversal switch contacts 25 to positive.

The connections to elevator motor 123 and gate operating motor 122 are typical for the starting, stopping and reversing of multi-phase motors and require no explanation.

When the car is in motion, the car gate is closed. To stop the car, the potential switch opens. Open gate magnet 115 is energized when the potential switch opens, and its back contact 109 closes. The energizing circuit may be traced from negative, through potential switch back contact 109, gate operating open limit 116—which closes as the car gate starts to close—close gate contact 117, open gate coil 115, wire 64 and thermal overload switch contacts 26 and phase reversal switch contacts 25 to positive. When open gate magnet is thus energized, its contacts 107 prevent the energizing of close gate magnet 102, its contacts 114 open the safety circuit as later traced, and its two upper pairs of contacts provide for the operation of gate motor 122 in the direction necessary to open the car gate. As the car gate starts to open, its opening movement opens gate switch 84, and the gate operating mechanism allows its associated retiring cam to unlock the door of the landing at which the car has come to rest, and also causes close limit 106 to open. As the car gate is completing its opening movement, the gate operating mechanism causes open limit 116 to open and thus de-energize open gate magnet 115.

The safety circuit may be traced from positive of transformer 30, through phase reversal switch contacts 25, thermal overload switch contacts 26, wire 64, open gate contact 114, contacts final limit 113, emergency switch 112, governor switch 111, landing door contacts 108, direction solenoid contacts 94 and 93, potential and direction switches, then to contacts 88 of the delay, secondary and duplicating magnets, and through gate switch 84, landing door lock contacts 83, and wire 75 to negative side of transformer 30. Each landing door contact 108 closes when its separate landing door closes, and landing door contact 83 is opened by a normally retired cam on the car which is mechanically actuated by the gate operating mechanism, and which opens the corresponding contact 83 and unlocks the corresponding landing door when the car is at rest at that landing. At all other times, all contacts 83 are closed and all landing doors are locked, and gate switch 84 is closed when the car gate closes. Governor switch 111 is on the car and opens when the elevator speed governor functions. Final limit switch 113 and up and down normal limit switches 55 are on the car and are functioned by stationary cams 60, 76, and 80 in the hoistway as shown in Figure 8.

When normal limit contact 55 opens, corresponding correction switch 134 closes, at which time corresponding correction finger 135 at the circuit arranging cylinder would normally rest on the insulated part of the cylinder. Should the cylinder be behind position with respect to the position of the car, finger 135 would rest on corresponding strip 3, and a proper direction panel magnet energizing circuit would be established from negative, through wire 75, jump magnet contacts 16 and 14, correction feed finger 136, finger 135, correction switch 134, panel magnet coil 124, wire 64, and thermal overload switch contacts 26 and phase reversal switch contacts 25 to positive. With the cylinder out of position only one step, the rising of the panel magnet, as the result of the energizing circuit just described, would energize the corresponding jump magnet, accomplishing the correction and bringing correction finger 135 on the insulated part of the cylinder. With the cylinder out more than one step, the action of the panel and jump magnets would be rapidly repeated until correction was accomplished. Should the drum be ahead of the car position with respect to that direction of car travel, correction would take place at the opposite terminal. Correction is not normally required, but might be called for through stopping and reversing between floors from the car with inspectors' switch 27 open during inspection, or by the inadvertent contacting of the switch on car by a service man riding on top of the car. If the drum was not manually reset before placing the elevator back in service, the correction device would automatically do so. For industrial purposes, I employ this correction device as a follow-up or step-by-step synchronous device to accomplish a similar result to that accomplished by so-called Selsyn motors. Mounted concentrically with cylinder 1, I apply a rocker, carrying brushes corresponding with correction fingers 135 and 135. When the rocker is moved one way or the other, the cylinder follows the movement in step-by-step jumps until the brushes rest on insulated portions of the cylinder. When the jump magnet coils of a remote cylinder are connected in series with the jump magnet coils of the home station cylinder, both cylinders jump in synchronism. Any number of remote cylinders may be thus moved in synchronism with the home station cylinder, or the remote cylinder jump magnet coils may be energized through stationary brushes co-operating with separate contacts mounted on the home station cylinder.

Figs. 15 and 16 illustrate this correcting or synchronizing arrangement; Fig. 15 being a side view and Fig. 16 being a front view and including the electrical connections. One pair of jump magnets 126 and one pair of panel or repeat magnets 124 are at the home station and one pair of jump magnets 126 with associated contacts and rotatable member is at each remote station. Rocker 81 pivoted concentrically with shaft 9, but on a separately supported bearing, at the home station, carries brushes 135 normally resting on insulation on the rotatable member, which latter is adapted to be rotated step-by-step in a clockwise or counter-clockwise direction as described in connection with Figs. 1, 2, and 5, and 5a. Finger 136 is always in contact with strip 3. When rocker 81 is moved, one of the fingers 135 connects with strip 3, and the other finger remains on the insulated part of the rotatable member. Current then flows from positive through opposite non-interference contact 98, corresponding panel or repeat magnet 124, the contacting finger 135, strip 3, finger 136, and contacts 14 at all stations, to negative. The energized repeat magnet opens its contacts 98 and closes its contacts 128 and 133. Contacts 133 connect through any set of contacts 14, either at the home station or a remote station direct to negative. The closing of contacts 128 energizes the corresponding jump magnet at the home station and at each remote station. The jump magnets may be energized in series or in multiple, but the multiple connection is preferable when alternating current is employed, and is so shown. As each jump magnet starts to rise, it opens its contacts 14. The moment any contacts 14 open, the continued energizing of all energized jump magnets is dependent upon contacts 128 of the energized repeat magnet, which is not de-energized until all energized jump magnets have completed their upward strokes and opened their contacts 16, when the repeat magnet is de-energized. If finger 135 is still in contact with strip 3, the cycle is repeated. The connections from repeat magnet contacts 128 to all corresponding jump magnets are to that jump magnet of each pair which will cause the corresponding rotatable member to jump one step in the direction in which rocker 81 at the home station was moved. Hence, all rotatable members will jump in unison, in clockwise or in counter-clockwise direction, and, if necessary, will continue to jump in unison, until both fingers 135 at the home station rest on insulation. Rocker 81 may be moved slowly or rapidly, or reversed slowly or rapidly, and all rotatable members will follow. The movement of each rotatable member is positive and its rotating force is limited only by the effort exertible by its jump magnet. The remote rotatable members cannot get out of synchronism with the home station rotatable member and the position of any one furnishes information as to the position of all.

If the desired rotatable range is in excess of about 170 degrees, and not in excess of about 350 degrees, the strip 3 contacting surface which accommodates finger 136, entirely circles the rotatable member at the home station, and the surfaces which accommodate fingers 135 are staggered. If the desired rotatable range is in excess of about 350 degrees, these surfaces are arranged to form helical contacting paths on the rotatable member, and a lateral movement also occurs as the rotatable movement takes place. A similar pitch lateral movement of the rocker 81 also takes place as it is rotated. Contacting provision for a multiplicity of revolutions may thus be made, and the provisions for obtaining corresponding movements of any rotatable member may be understood by reference to Figs. 15, 16, and 19, and later description. Operation may be from direction current or from alternating current. The combination of home station and remote station units is operable with only three common wires from the home station to all remote stations by eliminating the wire from repeat magnet contacts 133 to the remote station contacts 16, and by eliminating the wire from home station jump magnet contacts 14 to the remote station contacts 14 and connecting this wire to negative line at the home station, but the inclusion of these two common wires as shown, insures against any unit getting out of step, for with them and their associated contacts included, and the repeat magnets energized, either of the opposite repeat magnets cannot rise, and the energized repeat magnet cannot fall until all corresponding jump magnets at the home station and remote stations have completed their upward strokes. After the energized repeat magnet has fallen, neither it nor the opposite repeat magnet can rise until all of the raised jump magnets have completed their downward stroke.

The 1:1 ratio alone meets ordinary requirements for level stopping at landings, but with wide variations in load in the car, automatic variations in timing the relation between the action of the panel magnet and the corresponding jump magnet compensate for variations in speed resulting from changes in load. This is accomplished at variable binding posts 137 shown as normally connected together in the circuit leading to panel magnet contact 128.

When employed, this device includes a small centrifugal governor, belted or otherwise related to the shaft of the elevator motor, and which positions a contact connected to one variable binding post 137; the connection between the two binding posts being then normally open. A normally free cork-faced clutch is connected to a mechanical movement which causes a contact connected to the other binding post 137 to approach the contact connected to the opposite binding post. Electro-magnetic means, energized by the same electrical contacting which energizes the panel magnet, causes the clutch to engage. The contacts connected to the binding posts 137 will therefore close earlier at higher speed than at lower speed. Correction for mass is effected by proper proportioning of the levers and their angular relations which move the contact parts.

Load compensators are in use in which a change in the positioning of stopping contacts is effected by having the weight of the live load in the car cause such change to be made. In such devices, a spring usually intervenes between the car lifting cables and the car frame, and the variable compression of this spring due to changes in live load in the car provides the movement for changing the position of an arm on the car which is connected by cable to the stopping contact mechanism at the controller. With my own arrangement of switch on car contacts 127 and by such above referred to load weighing spring or by a centrifugal governor on the car, I can change the vertical position of contacts 127 with respect to the car. In other words, instead of mounting switch 127 directly on the frame of the car, I can mount it on a spring or governor actuated movable arm on the car. However, all of these are open to objections. My invention permits of the ready application of a small device to either a new or an old elevator, without special preparation of heavy parts, and permits of adjustments to compensate for varying relations between the high speed and low speed moving masses in an elevator, and for speed changes due to variations in line voltage as well as for changes due to variations in live load in the car, as further related to in more detail later.

Figs. 17 and 18 illustrate this arrangement. Fig. 18 shows a side view of gear 110 and related parts in Fig. 17. The governor shown as revolved by the elevator motor is of a type long used in connection with the carburetors of explosive engines. The sleeve at one end of the governor weight links is secured to the governor shaft and the sleeve at the other end may be moved laterally by the centrifugal action of the governor weights. Movable with this latter sleeve is adjustable arm 99 which is adjustably pivoted below the governor and is adjustably connected to raise and lower cross bar 100. When used in connection with elevators for which no initiating provision is made to slow down before the stopping provision takes effect, I usually so adjust the customary spring and collar on the governor shaft that no movement of arm 99 takes place until the power motor 123 has attained about 75 per cent of its free running speed. For such elevators, the variations in car speed usually range between this 75 per cent below to about 5 per cent above the speed corresponding with the free running speed of the motor.

Gear 110 revolves on independently supported stud 120 and is provided with a self-centering spring 129. Pivoted concentrically with gear 110 are independent switch arms 130 and 138. On each of these switch arms is a projecting lip to engage the pin on cross-bar 100, and an adjustable insulated electrical contact. On the gear, is insulated electrical contact 139. When 139 touches the electrical contact on either of the switch arms 130 or 138, the electrical circuit effect is the same as occurs when the two binding posts of variable 137 in Fig. 5a are electrically connected. The result is that the closing of contacts 128 of either the up panel magnet or of the down panel magnet 124 has no effect upon either of the jump magnets 126 until the circuit corresponding with variable 137 is closed. Hence, even though a fixed relation exists between the position of the car and the level of the landing at the time that switch on car 127 mechanically contacts with a hoistway obstruction—or a panel magnet is energized—any variation in the condition (such as variation in load) which affects the speed of the elevator motor, is automatically compensated for to bring about the desired coming to rest of the floor of the car level with the floor of the landing. For instance, should the elevator be running in the down direction with a heavy load in the car, the elevator motor—and the governor—would be running faster than with a light load in the car; contacts 130 and 138 would be lower and contact 139 would make its electrical connection to a jump magnet earlier than it would with a light load in the car running in the down direction, and there would thus be an earlier cutting of the current to the elevator motor and application of the brake. The balance of the adjustment resides in the provision of movable pivot points and attachments for taking advantage of the changeable angular movement of the arm which is moved by the horizontal movement of the governor. Secured to independently mounted shaft 141 is broad-faced pinion 140 which meshes with gear 110. Clutch 142 is normally spring-held in disengaged relation. Electro-magnet 143, when energized, is adapted to move clutch 142 into engaged position. The energizing coil of this magnet may be connected in series with the common connection to the positive side of the two panel magnets 124 in Fig. 5a, which will result in its being energized and de-energized simultaneously with either panel magnet, but especially when alternating current is employed, I prefer to use two magnets 143 and to connect the energizing coil of each in multiple with the energizing coil of a corresponding panel magnet 124.

When the elevator is in motion, cross-bar 100 assumes a position corresponding with the car speed. Pins on the two ends of cross-bar 100 engage with the under edges of the lips of switch arms 130 and 138, and hence determine the position of the switch arm contacts with relation to gear contact pin 139. As the speed increases, both switch arm contacts approach contact pin 139. When clutch 142 engages, pin 139 immediately starts in one direction or the other—depending upon the direction of car travel—toward the contact on switch arm 130 or 138. On electrical contact being made, the elevator motor—and hence pin 139—does not instantly stop, and the contacted switch arm moves upward with pin 139. In normal operation, magnet 143 is de-energized when corresponding panel magnet 124 is de-energized, and self-centering spring 129 returns gear 110 with pin 139 to normal position. Should poor adjustment of any part cause switch arm 130 or 138 to be raised beyond a pre-determined position, it actuates an electrical contact 146, which de-energizes magnet 143 and clutch 142 becomes disengaged.

As an alternate to the above described load compensator, to meet some requirements, I employ the dynamic braking effect described in my Patent 1,002,233. A small direct current generator whose armature is attached to the shaft of the elevator motor, generates a potential dependent upon the speed. When stopping, back contacts on the potential switch of the elevator motor connect this direct current to one of the phase windings of the multi-phase alternating current elevator motor, after the alternating current supply has been interrupted. A fixed magnetic field is thus produced in the stator of the elevator motor and, with a squirrel-cage rotor the dynamic braking effect is complete. The greater the speed, the greater is the dynamic braking effect, and as the direct current potential decreases in proportion with the decrease in speed, smooth and uniform stops at floor levels result, irrespective of the load. The dynamic brake is supplemented by a friction brake, which latter holds the elevator in stopped position. With a slip ring alternating current motor or with a direct current motor, the moving member is immediately or gradually short-circuited.

It is sometimes desirable that an automatic elevator be equipped with a parking device to insure the presence of the car at a specified landing, when not in use. The objections to the customary arrangement are increase in mileage, false stops and delay in service. My invention eliminates these objections, and permits of readily applying or eliminating the parking action, or of changing the parking landing at will. Referring to the description of Fig. 14 and to Fig. 5, wire 28 is connected to time element contact 69, and the latter to parking arm 70. Co-operating contacts 79 corresponding with such landings at which parking may be required, are connected to the positive side of their respective floor magnet coils. When any call is registered, direction solenoid 57 or 58 is in raised position and, consequently, the plunger which actuates time element contacts 63 and 69 is in raised position and contacts 63 and 69 are open. When the plunger descends, contact 63 closes before contact 69 closes and, in the event of reversal of car direction to respond to a registered call, the plunger again rises before contact 69 closes. When arm 70 is manually moved to any contact 79, a call registering and cancelling relation is established similar to that which would be established by the manual pressure of the corresponding landing push button, but with this difference: it would have no effect so long as any call registered from any button at any landing or in the car was claiming service.

In addition to the single rotative movement of the circuit-arranging cylinder as described, I may also employ a lateral movement of the cylinder to move the cylinder contacts into contacting relation with one or more additional sets of stationary fingers. With these movements, I also employ different colors of illumining for information purposes.

To meet some conditions, I may also employ a single rotative movement in conjunction with a sprocket and chain to move contacting fingers over stationary contacts on a plane surface.

Referring to the two preceding paragraphs, attention is directed to Figs. 19 and 7.

In Fig. 19, there is indicated the substitution of a threaded bearing for the plain bearing 10 shown in Fig. 1. This provides for a lateral movement of shaft 9 and anything secured to it simultaneously with rotative movement, and the width of gear 6 may be made sufficient to provide full bearing of pawls 12 and detent pin 17 as the lateral movement takes place. However, for cases in which the number of degrees through which it is desired to rotate shaft 9 is in excess of the number of degrees available for the up teeth, the down teeth and the detent dwells in a single vertical alignment as shown in Fig. 1, I arrange them in separate vertical alignments. In effect, I place a complete circle of gear teeth co-operating with up pawl 12, a complete circle of teeth co-operating with down pawl 12 and a complete circle of detent dwells 21—all shown in Fig. 2—in three separate vertical alignments, and secure them to shaft 9, or mount them on a sleeve which is feathered on shaft 9 and which sleeve is restrained from lateral movement by stationary shoulders bearing against each side of the sleeve. The co-operating pawls 12, hooks 13 and detent pin 17, are positioned to correspond. Provision is thus made for rotating shaft 9 and anything rotatably related to it through any number of degrees or any number of revolutions. When both rotative and lateral travel of shaft 9 is desired, the shaft is provided with a threaded bearing and the mounting of the teeth and dwells is on a sleeve which is feathered on shaft 9 and held in vertical alignment with the associated pawls, hooks and detent pin by stationary side bearings. With this arrangement any amount of rotative and lateral movement of shaft 9 may be obtained. If it is desired to rotate the rotatable member without lateral travel, but to provide a lateral as well as a rotative contacting path, guides on a swiveled contacting finger mechanically maintain its contact with a helically disposed contacting path on the rotatable member.

Fig. 7 shows a sprocket 144 secured to or feathered on shaft 9. 145 is a chain meshing with this sprocket and attached to the equivalent of plane surface and contacts as developed in Fig. 4. 19 and 20 represent the equivalent of the lines of contacts shown in Figs. 1 and 2. The plane surface may be moved any vertical distance by the rotary movement of shaft 9. If shaft 9 has only a rotative movement, sprocket 144 is secured to shaft 9. If shaft 9 has both a rotative and a lateral movement, sprocket 144 is feathered on shaft 9, and stationary side-bearings are provided to hold it in vertical alignment. Thus, with provision available for any amount of rotative or lateral movement, or a combination of both, it is evident that a step-by-step auxiliary contacting device, mechanically related to be moved at each revolution or part of a revolution of the circuit arranging member may be arranged to transfer its electrical connections to said circuit arranging member to be integrated by it, section by section.

Analysis of the foregoing specification when considered with relation to the means now available for effecting an electric contact through the manifestation of practically any phenomena, makes clear that my invention renders practical the functioning as one compact automatic mechanism, any number of separated units, with complete information furnished wherever desirable.

Having described my invention, I claim:

1. A system for electrically controlling the operation of remotely located mechanism, which comprises a rotatable member having electrical contact and insulating surfaces thereon, a multiplicity of contact fingers engaging said contacts and insulating surfaces, electro-magnet and switch members electrically connected with the contact fingers and with the remotely located mechanism, a ratchet gear to rotate the rotatable member and pawls engageable therewith to rotate same in either a clockwise or a counter-clockwise direction, electro-magnets to actuate each of said pawls and means cooperating with said pawls to prevent any over-throw of the ratchet gear upon each movement thereof, including a restraining hook for each pawl fulcrumed to swing a hook into engagement with a ratchet gear tooth on the opposite side of the gear from that engaged by the pawl, and thereby provide accurate settings when arranging any one of a number of circuit combinations to control the remote mechanism.

2. In an automatic elevator car control system, an electrical means for controlling the direction of car travel comprising an up directional magnet and a down directional magnet, a circuit arranging device to influence said magnets and a means to automatically reduce the resistance of the magnetic path of the last energized magnet to thereby actuate said last energized magnet ahead of the other magnet when a circuit is completed to both magnets simultaneously, whereby the previously established direction of car travel is re-established.

3. In an automatic elevator car control system, two electro-magnet members establishing the direction of up or down car travel and mechanical means associated with said electro-magnet members and providing for the continuation of the last established direction of travel in the event that the established electro-magnet means has been de-energized and both electro-magnetic means have been later simultaneously energized at the expiration of a pre-determined time period.

4. In an automatic elevator car control system, the combination of a circuit arranging device and means for establishing a direction of car travel and for providing selectively for stops in the established direction of travel, for uniform stopping for calls in said established direction as compared with a furthest call for the opposite direction irrespective of the sequence in which calls are placed and for holding calls until served, which means includes a delay magnet for selective control, a duplicating magnet for interrupting the elevator motor operating circuit and a secondary magnet to provide against interference.

5. In an automatic elevator car control system, the combination of a circuit arranging device and means for establishing a direction of car travel and for providing selectively for stops in the established direction of travel for uniform stopping for calls in said established direction as compared with a furthest call for the opposite direction, irrespective of the sequence in which calls are placed and for holding calls until served, which means includes a delay magnet for selective control, a duplicating magnet for interrupting the elevator motor operating circuit and a secondary magnet to provide against interference, and a mechanical member co-operating with said delay magnet to prevent the armature of same from dropping until after the secondary magnet is de-energized.

6. A means for controlling the separate energization of a pair of solenoids comprising a pivotally mounted mechanical member adapted to be engaged by plungers within the solenoids, whereby the solenoid last energized, when de-energized, will again be energized in advance of the other in the event of current being applied to both solenoids simultaneously.

7. In an elevator car control system, the combination with a rotatable circuit arranging device and electro-magnet and switch members co-operating therewith, of a correcting or synchronizing means comprising a correcting switch which is closed by the car movement when attaining a pre-determined position in conjunction with a repeat switch member adapted to cause the circuit arranging device to be rotated step by step the desired number of times to set same in proper relation to the car position.

8. Two electro-magnets, means to separately energize each magnet, and means to actuate the last energized magnet to the exclusion of the other magnet when current is directed to both magnets simultaneously.

9. In an automatic elevator car control system, an electrical means for controlling the direction of car travel comprising an up directional magnet and a down directional magnet, an electrical resistance associated with each magnet, means to automatically reduce the effect of the electrical resistance associated with the last energized magnet to thereby actuate said last energized magnet ahead of the other magnet when a circuit is completed to both magnets simultaneously, whereby the previously established direction of car travel is re-established.

10. Two electro-magnets, means to separately energize each magnet, an electrical resistance associated with each magnet and means to automatically reduce the resistance of the magnetic path and the effect of the electrical resistance associated with the last energized magnet, whereby the last energized magnet is actuated to the exclusion of the other magnet when current is directed to both magnets simultaneously.

11. In an automatic elevator car control system, means for controlling the direction of car travel comprising an up directional solenoid and a down directional solenoid, a circuit arranging device to influence said solenoids, plungers movable within said solenoids, a rocker member positioned in the path of said plungers and arranged to hold one or the other of said plungers in a raised position to permit the solenoid within which the raised plunger moves to act in advance of the other solenoid, and means to prevent the other solenoid from rising.

12. In an automatic elevator selective control system having means for registering calls to establish a direction of car travel which shall be maintained until the furthest call has been served and provision for the acceptance or refusal of intermediate calls as part of the selective system, means including a direction electro-magnet and a duplicating electro-magnet common to all landings, each magnet having an equal time period, and further means including a circuit arranging device having separate circuit arranging units adapted to independently co-operate with said direction electro-magnet or duplicating electro-magnet, whereby a time period is provided which is a constant in the sequence of operations required to bring the car to rest in responding to a call, irrespective of whether said call is one which would be normally accepted or normally refused were it an intermediate call.

13. The combination with a rotatable circuit arranging device and electro-magnet and switch members co-operating therewith, of a correcting or synchronizing means comprising an adjustable correcting switch movable to any desired position on said circuit arranging device, and a repeat switch member co-operating with said correcting switch and adapted to cause the circuit arranging device to be rotated step-by-step the desired number of times in a forward or reverse direction to set same in proper relation to any new position of the correcting switch.

14. In combination, a circuit arranging device comprising a rotatable member having insulating and contacting surfaces thereon, brushes engaging said insulating and contact surfaces and adapted to operate a remotely located mechanism in co-operation with electro-magnetically operated switch members, a correction switch comprising an adjustable brush member engaging said rotatable member and adjustable to any desired new position thereof, a repeat switch member co-operating with said correction switch and adapted to cause the current arranging device to be rotated step-by-step in a forward or reverse direction to set same in proper relation to any new position of the correction switch.

15. In an elevator control system having electrically operated means designed to bring a car to rest level with a landing, a movable electrical contact, means for moving said contact in one direction as the speed of the car increases and for moving said contact in the opposite direction as the speed of the car decreases; a second movable electrical contact having a normal position and means for moving the second contact from a normal position toward the first contact as said electrically operated means is energized.

16. In an elevator control system, an electrical circuit whose completion is designed to bring the elevator car to rest, means for preparing said circuit when the car reaches a definite position in its travel, in series relation in said circuit a first movable contact and a second movable contact whose meeting completes said circuit, means for moving the first movable contact toward the second movable contact as the speed of the car increases and away from it as the speed of the car decreases, and means for starting the movement of the second contact from a normal position toward the first contact simultaneously with the preparing of said circuit, whereby the car is brought to rest at a desired level irrespective of the speed of the car at the time the circuit is prepared.

17. In a parking device for an automatic elevator car system, manual means in the car and at landings for causing the registration of a call, means to avoid stopping the car at a parking landing until all manually registered calls have been served and still permit the registration of a call to the parking landing in response to the manual registration of a call at the landing or in the car corresponding with the parking floor.

18. In a parking device for an automatic elevator car system, manual means in the car and at landings for causing the registration of a call, means to avoid stopping the car at a parking landing until all manually registered calls have been served, and to provide for the return of the car to an intermediate parking landing without first traveling to a terminal regardless of the direction of travel established by the last manually registered call.

19. A system for electrically controlling the operation of remotely located mechanism, which comprises a rotatable member having electrical contact and insulating surfaces thereon, contact fingers engaging said contact and insulating surfaces, means to move said rotatable member in a lateral direction to lengthen the contacting path, and electro-magnetically actuated ratchet gear to rotate said rotatable member, and means to definitely stop said rotatable member at desired predetermined positions.

20. In an automatic elevator control system including a parking arrangement, means for registering calls from landings or the car corresponding with the several landings, electro-magnet operated means for determining the direction of car travel to respond to said calls and an electro-magnet operated time element responsive to the action of said direction means to delay the re-energizing of said direction means; a second time element also responsive to said direction means and controlling the effectiveness of said parking device, the relation between the two time elements being such that the parking arrangement cannot become effective while any call from a landing or the car is registered.

21. In an automatic elevator control system, a parking arrangement comprising a circuit arranging device, floor magnets corresponding to the floors to be served, a circuit closing member having contacts thereon, each contact being electrically connected through the circuit arranging device to one side of the power line, a contact arm engageable with any one of the floor magnet contacts, a line connecting same with the opposite side of the power line and a pair of normally closed contacts connected in series with said contact arm line, an up directional solenoid and a down directional solenoid, a time element solenoid co-operating with said directional solenoids and with said normally closed contacts; means including a time element and associated with said time element solenoid, a contact closing member operable thereby and contacts positioned with relation to the contact closing member to provide two time intervals, whereby the minimum time period between a car stop and the next start in the regular operation from the hall and car buttons is not affected and, further, whereby any false stop in transit is prevented; said contact arm being movable into engagement with any of the floor magnet contacts, whereby a call is registered to cause the car to return from any landing and stop at the floor corresponding with said floor magnet contacts and remain at such location until a call is registered through a push button which will energize one directional solenoid and the time control solenoid and will open the normally closed contacts through the energization of the said time control solenoid, but will prevent the car from stopping at the parking landing in response to the parking device so long as any call registered from any button at any landing or in the car is claiming service.

WILLIAM NOBLE DICKINSON.